United States Patent
Harding et al.

(10) Patent No.: US 9,758,234 B2
(45) Date of Patent: Sep. 12, 2017

(54) QUICK RELEASE HINGE

(71) Applicant: Rohr, Inc., Chula Vista, CA (US)

(72) Inventors: David Harding, San Diego, CA (US); William Heber, San Diego, CA (US)

(73) Assignee: Rohr, Inc., Chula Vista, CA (US)

(*) Notice: Subject to any disclaimer, the term of this patent is extended or adjusted under 35 U.S.C. 154(b) by 156 days.

(21) Appl. No.: 14/592,593

(22) Filed: Jan. 8, 2015

(65) Prior Publication Data
US 2016/0201371 A1   Jul. 14, 2016

(51) Int. Cl.
| | |
|---|---|
| B64C 1/14 | (2006.01) |
| B64D 29/00 | (2006.01) |
| B64D 29/06 | (2006.01) |
| B64D 29/08 | (2006.01) |
| E05D 5/06 | (2006.01) |
| E05D 7/10 | (2006.01) |

(52) U.S. Cl.
CPC ............ B64C 1/14 (2013.01); B64C 1/1446 (2013.01); B64D 29/00 (2013.01); B64D 29/06 (2013.01); B64D 29/08 (2013.01); E05D 5/06 (2013.01); E05D 7/1061 (2013.01); E05D 7/1066 (2013.01); E05D 2005/067 (2013.01); E05Y 2900/502 (2013.01)

(58) Field of Classification Search
CPC ...... B64D 29/08; B64D 29/06; B64C 1/1446; B64C 1/1407; B64C 1/14; F02K 1/70; E05Y 2900/502; E05D 7/1066; E05D 7/1061; E05D 5/06; E05D 2005/067
See application file for complete search history.

(56) References Cited

U.S. PATENT DOCUMENTS

| | | | |
|---|---|---|---|
| 1,646,644 A | 10/1927 | Economides et al. | |
| 2,209,659 A | 7/1940 | Mercer et al. | |
| 2,778,053 A | 1/1957 | Hess et al. | |
| 4,174,128 A | 11/1979 | Styck | |
| 4,637,642 A | 1/1987 | Stoecker | |
| 4,799,291 A | 1/1989 | Ankum et al. | |
| 4,848,034 A | 7/1989 | Pace | |
| 5,004,062 A | 4/1991 | Foot | |
| 5,826,823 A | 10/1998 | Lymons | |
| 6,027,071 A | 2/2000 | Lair | |

(Continued)

FOREIGN PATENT DOCUMENTS

| | | |
|---|---|---|
| AU | 1746870 A | 1/1972 |
| FR | 2590618 A1 | 5/1987 |

(Continued)

OTHER PUBLICATIONS

EP search report for EP16150434.5 dated Jun. 1, 2016.
Boeing, "GE90-70/80/90 Series Engines", 777 Aircraft Maintenance Manual, D633W101-ANG, Sep May 2014.

Primary Examiner — Richard R Green
(74) Attorney, Agent, or Firm — O'Shea Getz P.C.

(57) ABSTRACT

Aspects of the disclosure are directed to a system configured for installing or removing a door from an aircraft, the system comprising: a pin, a hinge comprising a slot that forms a cavity for rotatively coupling the hinge and the pin, a clamp coupled to the pin, and a retaining mechanism on the clamp that selectively bears against the hinge to maintain the pin in the cavity when the retaining mechanism is engaged and releases the hinge when the retaining mechanism is disengaged.

16 Claims, 8 Drawing Sheets

(56) References Cited

U.S. PATENT DOCUMENTS

| | | | |
|---|---|---|---|
| 6,155,520 A | 12/2000 | Giraud et al. | |
| 6,604,355 B1 | 8/2003 | Sternberger | |
| 6,688,099 B2 | 2/2004 | Lair | |
| 7,874,142 B2 | 1/2011 | Beardsley | |
| 8,002,217 B2 | 8/2011 | Sternberger | |
| 8,052,085 B2 | 11/2011 | Lair | |
| 8,091,827 B2 | 1/2012 | Lair | |
| 2011/0138574 A1* | 6/2011 | Bogue | B64D 29/06 29/402.09 |
| 2012/0308369 A1* | 12/2012 | Maheshwari | B64D 33/02 415/182.1 |
| 2013/0259641 A1 | 10/2013 | Stewart | |

FOREIGN PATENT DOCUMENTS

| | | |
|---|---|---|
| FR | 2623553 A1 | 5/1989 |
| GB | 1014377 A | 12/1965 |
| WO | WO2006136939 A2 | 12/2006 |

\* cited by examiner

QUICK RELEASE HINGE

BACKGROUND

A hinged door is often supported by a hinge pin which defines the axis of rotation of the door. In order to remove the door, the hinge pin may be removable by sliding it off of the hinge. In some applications, however, there may be an obstruction which impedes the removal of the hinge pin. The present invention is directed towards removing a hinged door or panel without removal of the hinge pin.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system configured for installing or removing a door from an aircraft, the system comprising: a pin, a hinge comprising a slot that forms a cavity for rotatively coupling the hinge and the pin, a clamp coupled to the pin, and a retaining mechanism on the clamp that selectively bears against the hinge to maintain the pin in the cavity when the retaining mechanism is engaged and releases the hinge when the retaining mechanism is disengaged. In some embodiments, the hinge is configured as a gooseneck hinge. In some embodiments, the door is coupled to the hinge, and the door is a latch access door. In some embodiments, the clamp comprises a through hole that rotatively receives the pin for coupling the clamp and the pin. In some embodiments, the clamp is configured to removably rotate about the pin when the retaining mechanism is disengaged with respect to the hinge. In some embodiments, the system further comprises an attachment mechanism to couple the pin to a structure of the aircraft. In some embodiments, the structure of the aircraft comprises a latch beam on a thrust reverser. In some embodiments, the system further comprises a thermal blanket that is positioned to physically obscure access to the attachment mechanism. In some embodiments, the retaining mechanism comprises at least one of a screw, a nut, or a bolt.

Aspects of the disclosure are directed to a system comprising: a hinge comprising a slot that forms a cavity for rotatively coupling the hinge and a pin, a clamp coupled to the pin, and a retaining mechanism that couples the clamp and the hinge when the retaining mechanism is engaged with respect to the hinge and decouples the clamp and the hinge when the retaining mechanism is disengaged with respect to the hinge. In some embodiments, the retaining mechanism is on the clamp and selectively bears against the hinge to maintain the pin in the cavity when the retaining mechanism is engaged and releases the hinge when the retaining mechanism is disengaged.

Aspects of the disclosure are directed to a system comprising: a door, a hinge coupled to the door, the hinge including a slot configured to form a cavity for receiving a pin. In some embodiments, the system further comprises the pin. In some embodiments, the hinge is configured as a gooseneck hinge. In some embodiments, the door is a latch access door associated with an aircraft nacelle.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more components may refer to a direct connection or an indirect connection. An indirect connection may incorporate one or more intervening components.

Various aspects of the disclosure are directed to a removal or installation of a unit of an aircraft, such as a latch access door or other types of access panels or doors. Opening the latch access door may enable a user (e.g., a technician or a mechanic) access to additional latches that may be used to open or close components on an aircraft, such as a fan cowl or a thrust reverser on an aircraft's nacelle.

Figure 1:
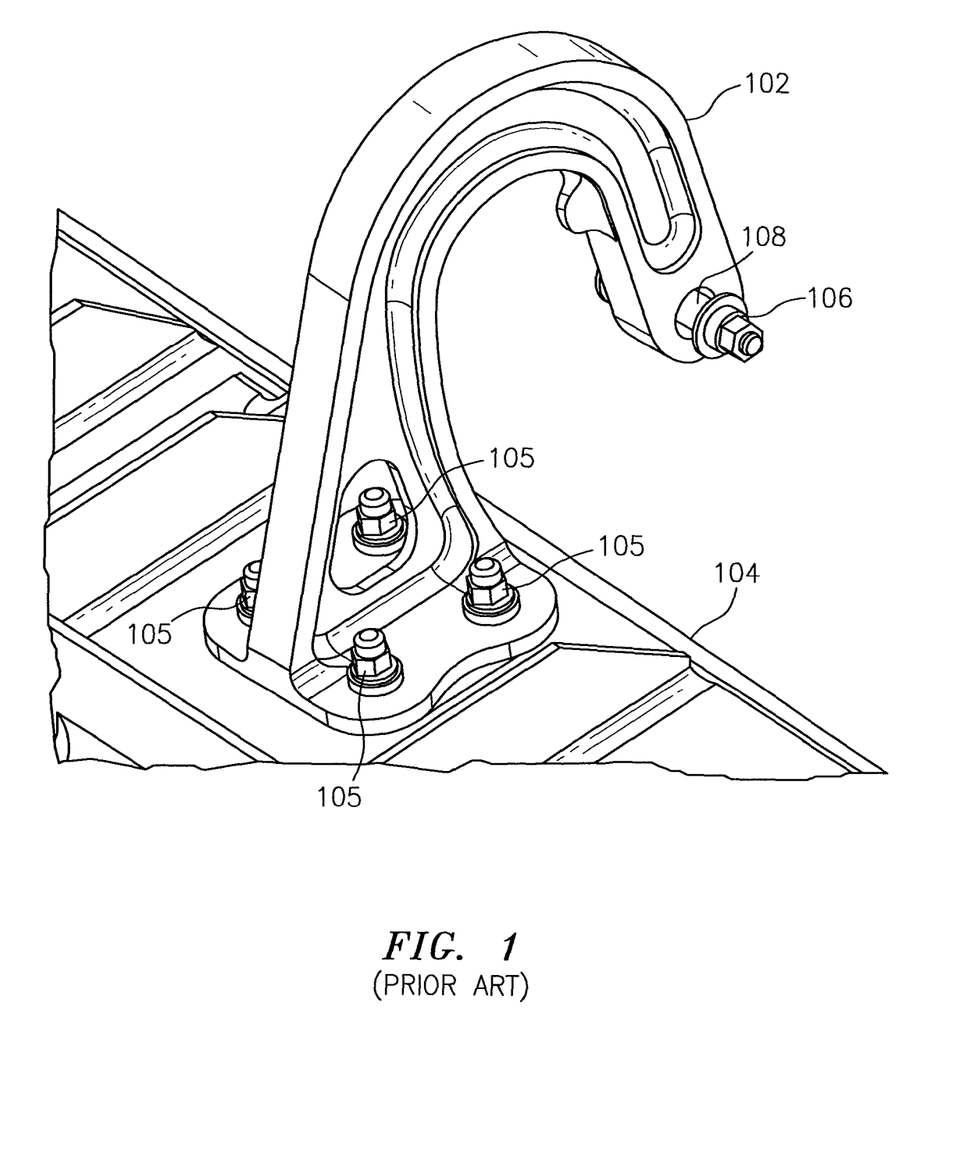
FIG. 1 illustrates a hinge attached to a door and configured to rotate about a pin.

Referring now to FIG. 1, a prior art gooseneck hinge 102 is shown as being coupled to a latch access door 104 via one or more nuts-and-bolts 105. One or more attachment mechanisms 106, such as a nut-and-bolt configuration, may be used to couple the hinge 102 to a portion of the aircraft via a hinge/clevis pin 108. The pin 108 may define an axis for opening or closing the latch access door 104 via a rotation of the hinge 102 about the pin 108. The attachment mechanism 106 may couple the pin 108 to a structure of the aircraft such as the aircraft's engine nacelle, and more particularly to a thrust reverser latch beam.

In some embodiments, access to an attachment mechanism 106 may be obscured by another component, such as a thermal blanket (not shown in FIG. 1). In order to gain access to the attachment mechanism 106 and remove the pin 108 to remove the door, a user would need to bend out of the way or remove the thermal blanket, which is not ideal.

Figure 2A:
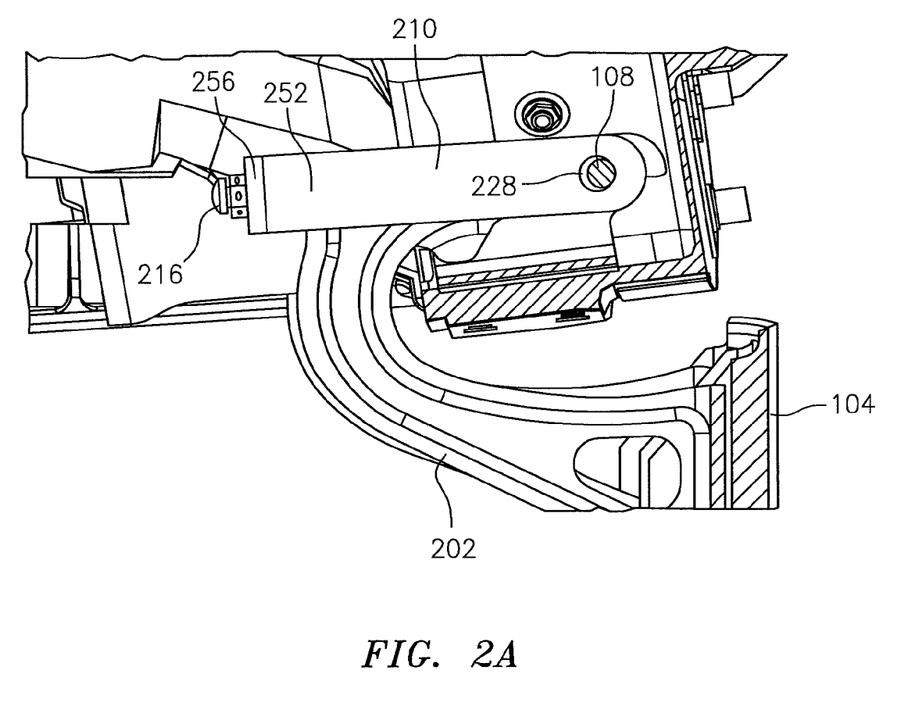
FIGS. 2A-2B illustrate a hinge and door coupled to a pin via a slot formed in the hinge and a clamp for selectively retaining the hinge.
Figure 2B:
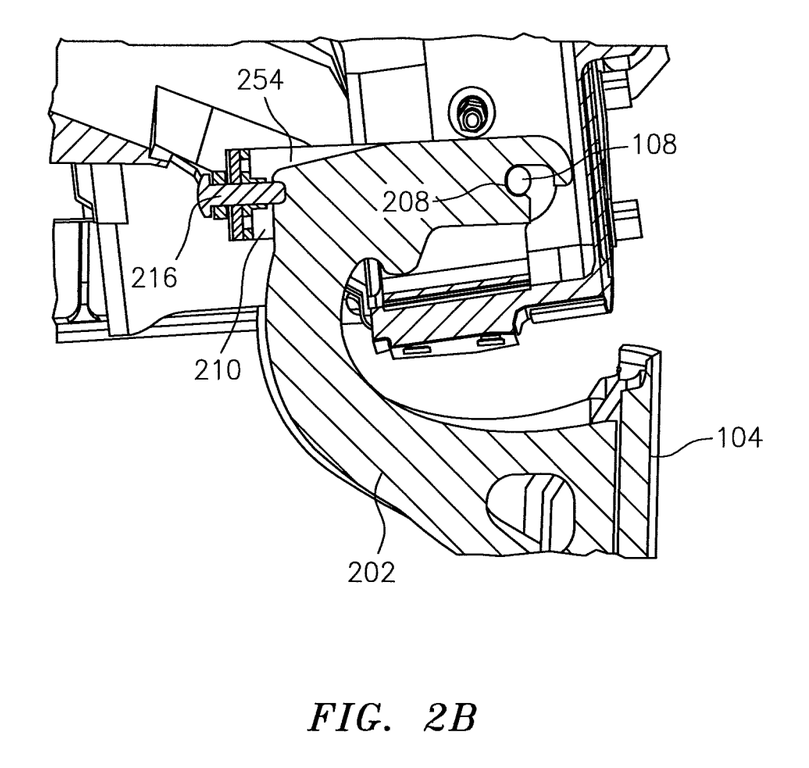

Referring now to FIGS. 2A-2B (collectively referred to as FIG. 2), an embodiment of a hinge 202 and the door 104 is shown about the pin 108. The hinge 202 may be similar to the hinge 102 of FIG. 1. However, whereas the hinge 102 may radially encircle or radially encapsulate the pin 108, the hinge 202 may be configured to include a slot 208 such that the pin 108 can reside in a cavity formed via the slot 208.

As shown in FIG. 2, a clamp 210 may be included. The clamp 210 has two parallel legs 252 and 254 and an end 256 connecting the first end of the legs. Each of the legs 252 and 254 may be configured with a through hole 228 proximate the second end of the legs 252 and 254 (opposite the first end 256) to allow the clamp 210 to be rotatably coupled to the pin 108. The clamp 210 may include, or be coupled to or associated with, a retaining mechanism 216 that may be used to selectively lock the pin 108 into the cavity of the slot as shown in FIG. 2. The retaining mechanism 216 provides a compressive force against the hinge to push the slot 208 onto the pin 108 to prevent the slot 208 from disengaging from the pin 108. At the same time a tension force is created in each of the legs # of the clamp 210. The clamp 210 and the retaining mechanism 216 may limit wear of the slot 208 and pin 108 by providing a biasing force to keep them together and minimize vibration between them.

Figure 6:
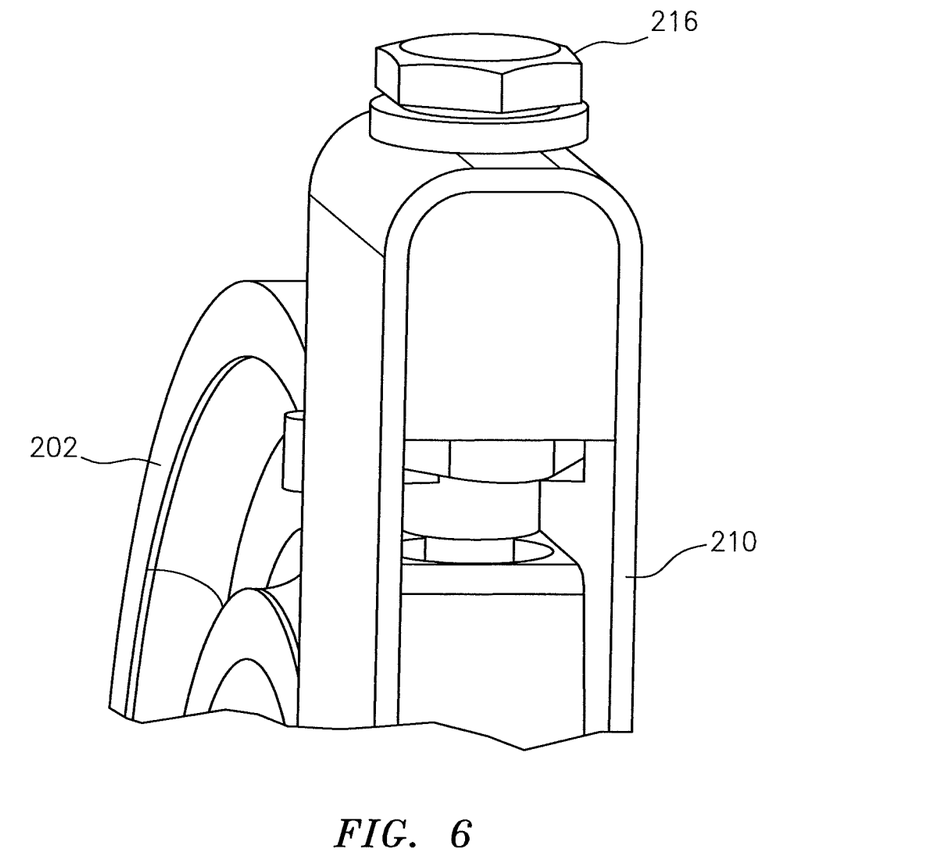
FIG. 6 illustrates an additional view of the retaining mechanism.

In some embodiments, the retaining mechanism 216 may include one or more of a screw, a nut-and-bolt, etc. FIG. 6 illustrates an embodiment of the retaining mechanism 216.

Figure 3:
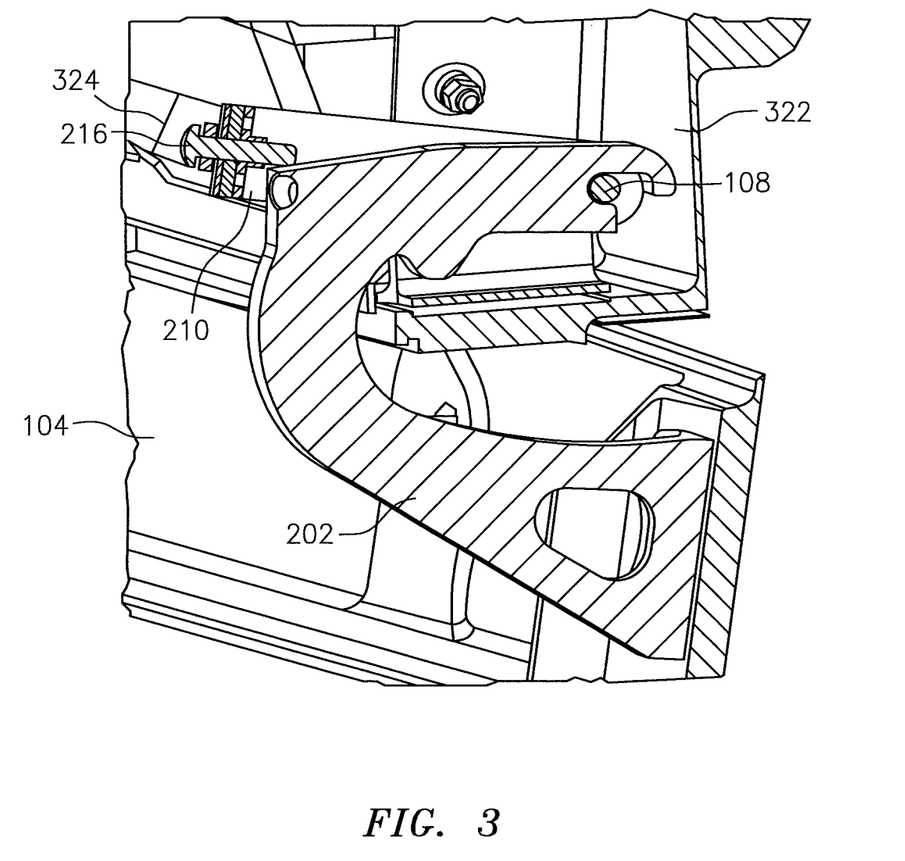
FIG. 3 illustrates the clamp of FIGS. 2A-2B disengaged from the hinge.

FIG. 3 illustrates an embodiment of the hinge 202 and the door 104 coupled to a structure 322 (e.g., a latch beam) via the pin 108. Also shown in FIG. 3 is an instance of a thermal blanket 324 that may obscure or make difficult access to attachment mechanisms (e.g., attachment mechanisms 106 of FIG. 1) and pin 108 for removal. In contrast to FIG. 2, where the retaining mechanism 216 is shown in an engaged state/condition with respect to the hinge 202, in FIG. 3 the retaining mechanism 216 is shown in a disengaged state/condition with respect to the hinge 202 and the clamp 210 is shown as having been slightly rotated (in a clockwise direction) in preparation for removal of the door 104. When the retaining mechanism 216 is disengaged in such a manner, the hinge 202 may be removed by disengaging the pin 108 from the slot 208 (e.g., in order to remove the door 104) or installed by engaging the pin 108 in the slot 208 (e.g., in order to install the door 104).

Figure 4:
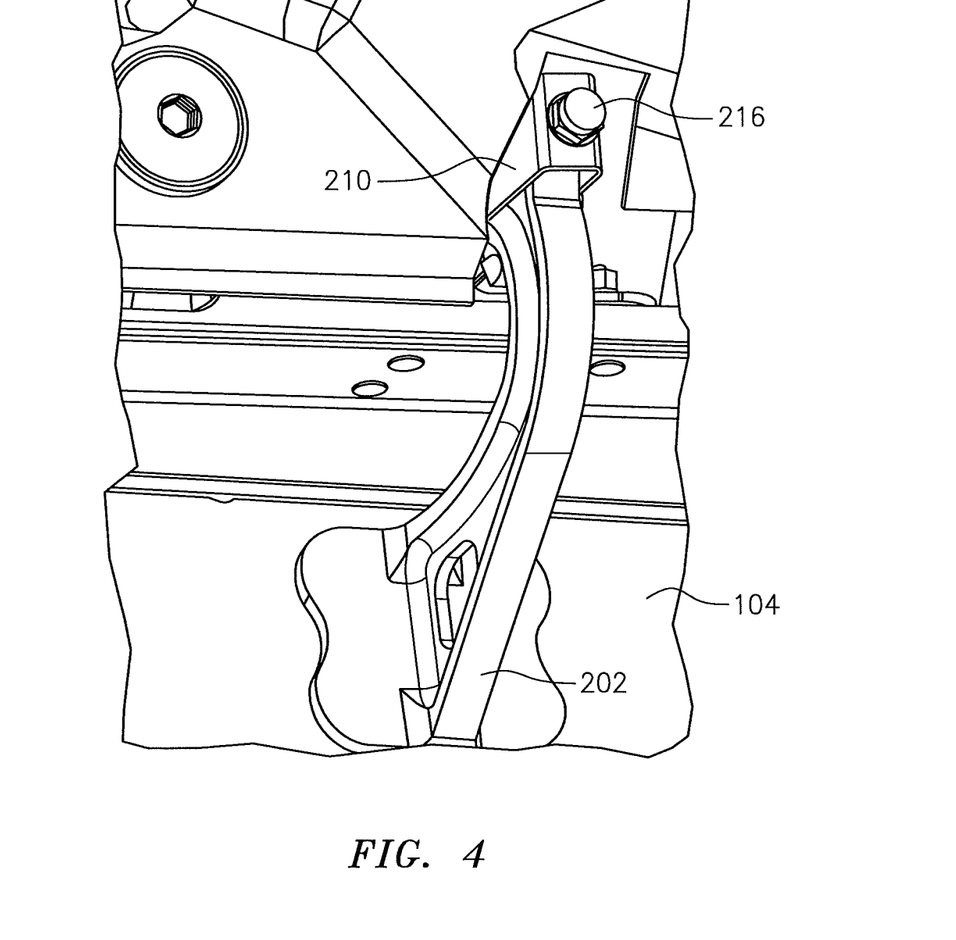
FIG. 4 illustrate a perspective view of the clamp of FIGS. 2A-2B and an associated retaining mechanism.

FIG. 4 illustrates an embodiment of the hinge 202 and the door 104 in association with the clamp 210 and the retaining mechanism 216. FIG. 4 illustrates the ease of user access to the retaining mechanism 216 and the clamp 210 for removing or installing the door 104. In this respect, the retaining mechanism 216 and the clamp 210 may implement a so-called quick-release feature.

Figure 5A:
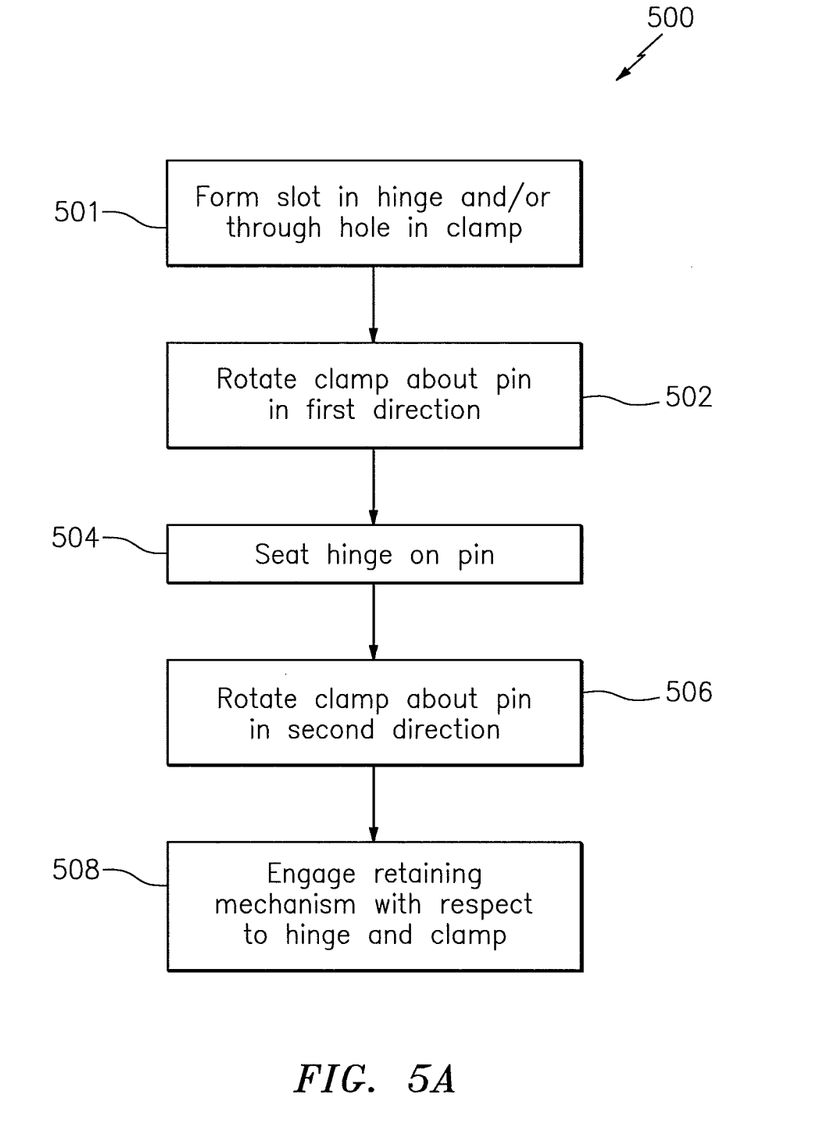
FIGS. 5A-5B illustrate flow charts of exemplary methods in accordance with one or more aspects of this disclosure.

Referring to FIG. 5A, a flow chart of an exemplary method 500 is shown. The method 500 may be used to install a door (e.g., the door 104) to an aircraft structure (e.g., a latch beam).

In step 501, a slot (e.g., the slot 208) may be formed in a hinge (e.g., the hinge 202). In step 501, a through hole (e.g., the through hole 228) may be formed in a clamp (e.g., the clamp 210).

In step 502, the clamp may be rotated about a pin (e.g., the pin 108) in a first direction in order to create room for the hinge to be seated on the pin.

In step 504, the hinge may be seated on the pin. As part of step 504, the pin may be inserted into a hole/cavity formed via a slot (e.g., the slot 208) in the hinge.

In step 506, the clamp may be rotated about the pin in a second direction. The rotation of the clamp in step 506 may be in an opposite direction to the rotation of step 502, so as to (re)align the clamp with the hinge.

In step 508, a retaining mechanism (e.g., the retaining mechanism 216) associated with the clamp may be engaged with respect to the hinge.

Figure 5B:
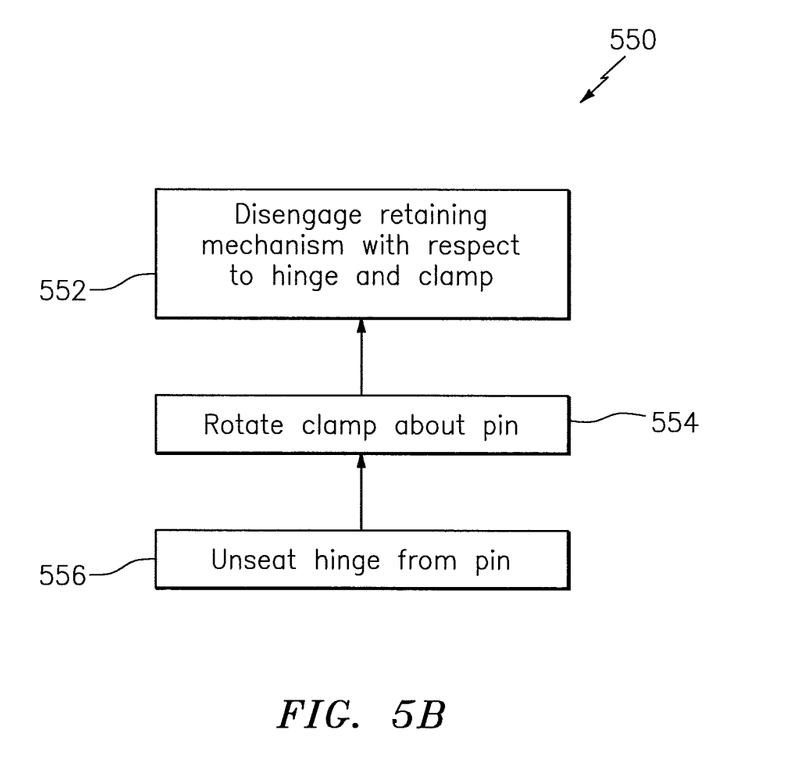

Referring to FIG. 5B, a flow chart of an exemplary method 550 is shown. The method 550 may be used to remove a door (e.g., the door 104) from an aircraft structure (e.g., a latch beam).

In step 552, a retaining mechanism (e.g., the retaining mechanism 216) associated with the clamp may be disengaged with respect to the hinge.

In step 554, the clamp may be rotated about a pin (e.g., the pin 108) to misalign the clamp and the hinge in order to create room for the hinge to be unseated from the pin.

In step 556, the hinge may be unseated from the pin. The removal of the hinge from the pin in step 556 may be achieved using a combination of rotations and/or translations to avoid striking the door or any adjacent structure.

While described above as separate methods 500 and 550 for the sake of illustrative convenience, in some embodiments one or more of the aspects of the method 500 may be combined with one or more aspects of the method 550.

Technical effects and benefits of the present invention include an ability to quickly remove or install an access door or panel without removing a hinge pin or its associated fasteners, or without removing any components that might obstruct or impede removal of a hinge pin.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

The invention claimed is:

1. A system for an aircraft, the system comprising:
    a nacelle door;
    a pin having an axis;
    a hinge coupled to the nacelle door, the hinge comprising a slot that forms a cavity for rotatively coupling the hinge and the pin, wherein the slot extends partially into the hinge at a distal end of the hinge, the slot extends through the hinge between opposing sides of the hinge, the hinge is configured as a gooseneck hinge, and the hinge does not radially, relative to the axis, encircle or encapsulate the pin;
    a clamp coupled to the pin; and
    a retaining mechanism on the clamp that selectively bears against the hinge to maintain the pin in the cavity when the retaining mechanism is engaged and releases the hinge when the retaining mechanism is disengaged.

2. The system of claim 1, wherein the nacelle door is a latch access door.

3. The system of claim 1, wherein the clamp comprises a through hole that rotatively receives the pin for coupling the clamp and the pin.

4. The system of claim 1, wherein the clamp is configured to removably rotate about the pin when the retaining mechanism is disengaged with respect to the hinge.

5. The system of claim 1, further comprising:
    an attachment mechanism to couple the pin to a structure of the aircraft.

6. The system of claim 5, further comprising:
    a thermal blanket that is positioned to physically obscure access to the attachment mechanism.

7. The system of claim 1, further comprising:
    a structure comprising a latch beam on a thrust reverser; and
    an attachment mechanism to couple the pin to the structure.

8. The system of claim 1, wherein the retaining mechanism comprises at least one of a screw, a nut, or a bolt.

9. A system comprising:

a nacelle door;

a hinge coupled to the nacelle door, the hinge comprising a slot that forms a cavity for rotatively coupling the hinge to a pin such that the hinge is operable to rotate about a longitudinal axis of the pin, wherein the slot laterally extends partially into the hinge at a distal end of the hinge from an exterior peripheral surface of the hinge to a parti-cylindrical interior surface of the hinge that defines the slot, and wherein the slot longitudinally extends through the hinge between opposing sides of the hinge;

a clamp coupled to the pin; and a retaining mechanism that couples the clamp and the hinge when the retaining mechanism is engaged with respect to the hinge and decouples the clamp and the hinge when the retaining mechanism is disengaged with respect to the hinge, wherein the retaining mechanism comprises a fastener configured to project through an aperture in the clamp to engage the hinge.

10. The system of claim 9, wherein the retaining mechanism is on the clamp and selectively bears against the hinge to maintain the pin in the cavity when the retaining mechanism is engaged and releases the hinge when the retaining mechanism is disengaged.

11. The system of claim 9, wherein the hinge does not radially, relative to the axis, encircle or encapsulate the pin.

12. A system for an aircraft, comprising:

a nacelle door;

a hinge coupled to the nacelle door, the hinge including a slot configured to form a passageway and a cavity for receiving a pin, wherein the slot laterally extends partially into the hinge from an exterior surface of the hinge at a distal end of the hinge such that, during mating of the hinge to the pin, the pin is operable to pass laterally through the passageway and then into the cavity, and wherein the passageway and the cavity longitudinally extend through the hinge between opposing sides of the hinge;

a clamp coupled to the pin; and a retaining mechanism on the clamp that selectively bears against the hinge to maintain the pin in the cavity when the retaining mechanism is engaged and releases the hinge when the retaining mechanism is disengaged.

13. The system of claim 12, further comprising the pin having an axis, wherein the hinge is configured to rotate about the axis when the pin is received within the cavity.

14. The system of claim 13, wherein the hinge does not radially, relative to the axis, encircle or encapsulate the pin.

15. The system of claim 12, wherein the hinge is configured as a gooseneck hinge.

16. The system of claim 12, wherein the nacelle door is a latch access door associated with an aircraft nacelle.

* * * * *